United States Patent [19]

Gieselman

[11] Patent Number: 4,654,996
[45] Date of Patent: Apr. 7, 1987

[54] CASTING ROD HANDLE WITH PISTOL GRIP AND BUTT EXTENSION

[76] Inventor: David A. Gieselman, Coos Bay, Oreg.

[21] Appl. No.: 864,087

[22] Filed: May 16, 1986

[51] Int. Cl.$^4$ ............... A01K 87/00; A01K 97/16
[52] U.S. Cl. ............................................. 43/23; 43/25
[58] Field of Search ............................. 43/22, 23, 25

[56] References Cited

U.S. PATENT DOCUMENTS

| | | | |
|---|---|---|---|
| 980,942 | 1/1911 | Hanson | 43/23 |
| 2,000,263 | 5/1935 | Teetor | 43/23 |
| 2,084,931 | 6/1937 | Williams | 43/23 |
| 2,149,837 | 3/1939 | Browne | 43/23 |
| 2,194,639 | 3/1940 | Cole | 43/22 |
| 2,283,816 | 5/1942 | Loutrel | 43/22 |
| 2,911,750 | 11/1959 | Garner | 43/22 |
| 3,196,572 | 7/1965 | Steinle | 43/22 |

Primary Examiner—Kuang Y. Lin
Assistant Examiner—Carmine Cuda
Attorney, Agent, or Firm—Chernoff, Vilhauer, McClung & Stenzel

[57] ABSTRACT

A fishing rod having a handle including a pistol grip located rearwardly from and beneath a reel seat for holding a casting reel, and having a butt extension member supported rearwardly and spaced upwardly apart from the reel seat. A butt extension support limb is curved rearwardly and laterally away from the reel seat to support the forward end of the butt extension member without interfering with the fisherman's wrist and forearm during casting of bait or playing a hooked fish using the rod.

18 Claims, 6 Drawing Figures

U.S. Patent  Apr. 7, 1987  4,654,996
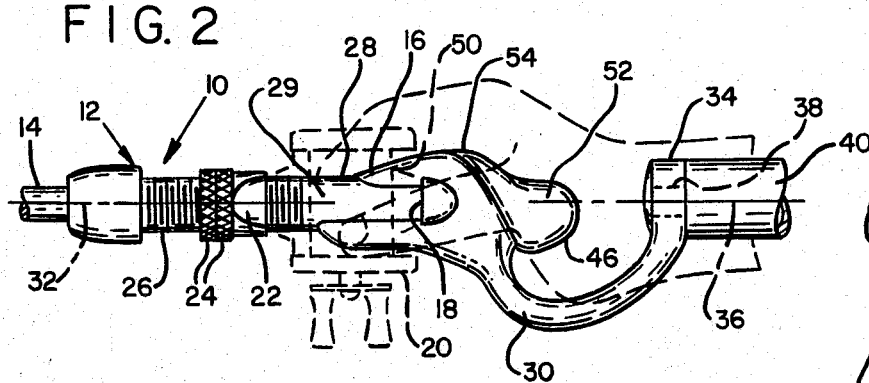
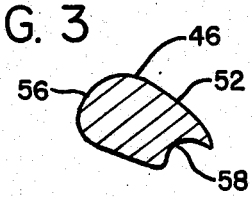
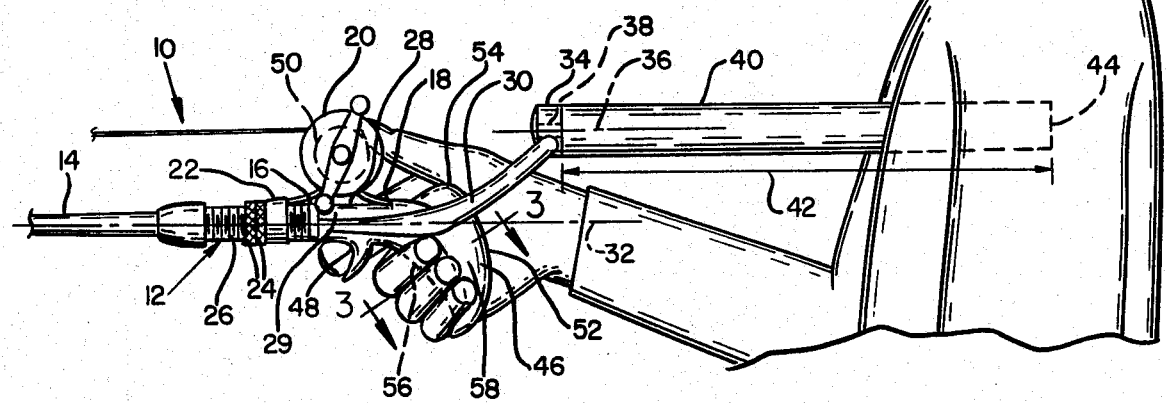
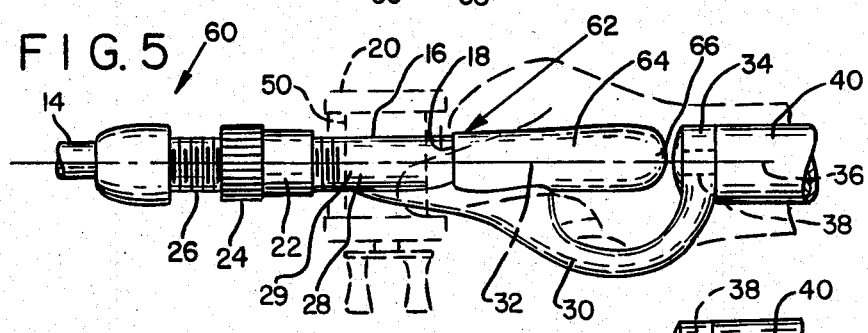
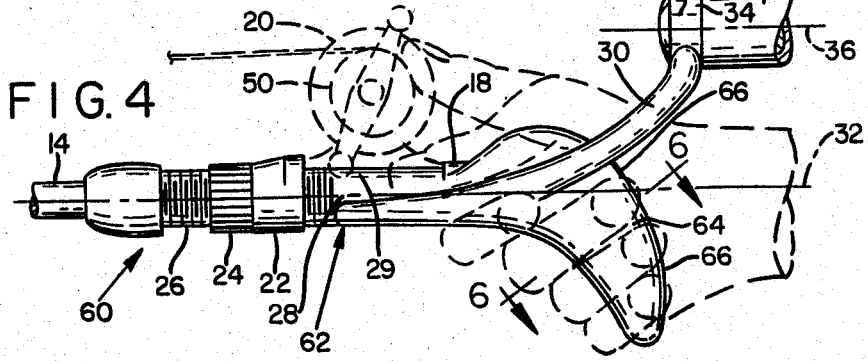
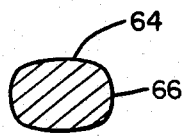

CASTING ROD HANDLE WITH PISTOL GRIP AND BUTT EXTENSION

BACKGROUND OF THE INVENTION

The present invention relates to fishing rods, and particularly to an improved handle for bait casting rods.

In fishing using bait such as fish eggs, shrimp, and the like and using plugs and other lures of significant weight, it is often desirable to use a fishing rod and a reel known as a bait casting reel. Such a reel has a rotatable spool mounted with its axis of rotation horizontal and transverse to the length of a fishing rod on which such a reel is mounted. A crank mechanism and a brake are normally provided to control winding and unwinding of line from such a reel, but during casting, in order to control the distance of a cast and to prevent line remaining on the spool from becoming tangled as a result of the continued rotation of the spool after the bait has hit the water, it is usually necessary to control the spool by applying pressure to it using the thumb of the hand in which the rod is held during casting. It is therefore very desirable to hold the hand in a position behind the spool of a reel used on such a rod. With many previously available casting rods, however, it has not been easy to reach the spool of a casting reel mounted on the rod.

While it is usually desirable to maintain tension in a fish line while playing a fish, by holding the fishing rod so that the line causes non-longitudinal pressure to be applied to the tip of the rod, thus bending the rod, some line tension is, nevertheless, applied to the reel in a direction longitudinal of the rod. It has therefore been found desirable in the past to provide a pistol grip portion of a rod behind the mounting location for a casting reel and some other types of reels, so that the rod cannot be pulled out of one's hand by a strong fish.

Some fishing rods are equipped with butt extensions or "fighting butts", which may be used to provide additional leverage to apply tension to the line while a fish is being fought. In the past, however, it has not been shown how to provide a fishing rod having all of the benefits of an extended butt together with the advantages of a pistol grip, without some interference of one with the other. As an example, Williams U.S. Pat. No. 2,084,931 discloses a pistol grip attachment for use on a deep sea fishing rod having an extended butt portion. The Williams pistol grip, however, provides no increased ability to "thumb" a casting reel mounted on a rod equipped with such a pistol grip.

Hanson U.S. Pat. No. 980,942 discloses a rod having a pistol grip and a butt extension directed rearwardly from the lower end of the pistol grip. While this arrangement has utility, the rearward extension of the rod is not in a particularly advantageous position for providing the desired additional leverage useful in fighting a fish.

Browne U.S. Pat. No. 2,149,837 discloses a fishing rod handle having a rearward extension including a curved elbow seat. Like that of the Hanson rod, this rearward extension is also located at the lower rear end of a pistol grip portion of the Browne rod handle.

Loutrel U.S. Pat. No. 2,283,816 discloses a fishing rod having a pistol grip located beneath a casting reel. A handle coaxial with the rod, however, interferes with the possibility of "thumbing" the spool of the reel.

Garner U.S. Pat. No. 2,911,750 discloses a casting rod handle having a sloping pistol grip and a downwardly-extending trigger, but no rearward extension of the rod's butt portion. Teetor U.S. Pat. No. 2,000,263 discloses a somewhat similar fishing rod handle which is pivotable, but discloses no rearward extension of the butt of the rod.

Steinle U.S. Pat. No. 3,196,572, and Cole U.S. Pat. No. 2,194,639 also disclose pistol-grip casting rods including a trigger-like portion and holding a reel within reach of the user's thumb.

What appears to be lacking in the previously known fishing rods, however, is a rod including a pistol grip providing access to the spool of a reel so that it can effectively be controlled by the pressure applied by the user's thumb, together with a rearward extension of the butt portion, located so as to be useful in applying leverage to the rod, but so as not to interfere with casting.

SUMMARY OF THE INVENTION

The present invention provides a handle for a fishing rod which overcomes the disadvantages and shortcomings of the previously-known casting rods. In the casting rod handle according to the present invention, a reel seat is provided to hold the foot of a casting reel, and a pistol grip extends rearwardly and downwardly from a position behind the reel seat so that a hand grasping the pistol grip is properly located for application of the thumb in the desired manner to control the rotation of the line spool of the reel. Nevertheless, a rearward extension of the butt is provided in a desirable location and without interfering with the ability to hold the rod effectively by using the pistol grip. This is accomplished by the provision of a support limb originating near the reel seat and extending laterally and rearwardly. The support limb curves upwardly and carries a mount to receive the forward end of the butt extension member, holding the butt extension parallel with the rod, but spaced above and rearwardly from the rearmost end of the rod and the pistol grip portion of the handle.

It is therefore a primary object of the present invention to provide a fishing rod including a butt extension and a pistol grip portion located relative to each other so that the pistol grip can be used without interference from the butt extension.

It is another important object of the present invention to provide an improved rod adapted for use with casting reels having transversely mounted spools, so that such rods can be held securely and the casting reels mounted on such rods can be controlled efficiently.

A principal feature of the fishing rod according to the invention is a curving support limb extending rearwardly from a reel seat located adjacent a pistol grip and supporting a butt extension member spaced rearwardly and upwardly apart from the reel seat.

It is another important feature of the present invention that it provides a casting rod having a comfortable pistol grip including a trigger portion and a hand grip extending downwardly and rearwardly in a position behind the reel so as to provide a secure grip on the rod while simultaneously facilitating use of the thumb of the hand holding the pistol grip to control the line spool of a casting reel mounted on the rod handle.

A further feature of the fishing rod handle of the present invention is that the pistol grip portion is shaped especially to be gripped comfortably and securely by one hand of the user, while the location of a rearwardly and upwardly extending support limb for holding a rearward butt extension avoids interference with the hand used to hold the pistol grip portion.

An important advantage of the rod handle of the present invention is its greater convenience, in comparison with previously-known fishing rods, for controlling and holding a fishing rod both during casting and while fighting a large fish.

Another advantage of the present invention is the better position it affords for the user's hand with respect to control of a casting reel, especially during casting.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a side view of a fisherman using a casting rod equipped with a rod handle embodying the present invention.

FIG. 2 is a top view of the rod handle shown in FIG. 1.

FIG. 3 is a sectional view, taken along line 3—3, of a pistol grip portion of the rod handle shown in FIG. 1.

FIG. 4 is a side view of a rod handle which is another embodiment of the present invention.

FIG. 5 is a top view of the rod handle shown in FIG. 4.

FIG. 6 is a sectional view of the pistol grip portion of the rod handle shown in FIG. 4 taken along line 6—6.

DETAILED DESCRIPTION OF THE INVENTION

Referring now to FIGS. 1-3 of the drawings, a fishing rod 10 includes a rod handle portion 12 supporting a rod member 14 which extends forward in the usual manner and may include line guides and a tip (not shown) of the usual type. The details of construction of the rod member 14 do not form a part of the present invention, and are therefore not described herein. The rod handle 12 includes a base portion 16 including an appropriate catch 18 for holding a rear tang of the foot of a casting reel 20, while a longitudinally slideable ring 22 and a pair of internally-threaded knurled nuts 24 are located on a threaded portion 26 of the base portion 16 to hold a front tang of the foot of the reel 20 in the well-known manner. The part of the base portion 16 located beneath the foot of the casting reel 20 will be referred to hereinafter as a reel seat 28. The reel seat 28 includes a supporting surface 29 which extends generally parallel with the length of the rod member 14. Extending leftward, curvingly upward and rearward from the left side of the reel seat 28 is a butt extension support limb 30. The support limb 30 extends diagonally laterally away from the reel seat 28, and thence curves upwardly rearwardly, and curvingly laterally back toward the longitudinal axis 32 of the base portion 16 approximating a half-turn of a helix in shape.

A butt extension mount 34 is a short cylindrical body attached to the rearward end of the support limb 30 and oriented with its central axis 36 parallel with the longitudinal axis 32 of the base portion 16. A central hole 38 is provided in the butt extension mount 34 to receive a front end of a butt extension 40, which is attached securely to the butt extension mount 34 by use of an appropriate fastener or adhesive, depending on the construction of the butt extension 40, which may be a hollow fiberglass core covered with cork rings, for example. Preferably, the butt extension mount 34 is at least about 3 inches rearward and 1-½ inches upward from the rear of the reel seat 28, to provide ample clearance. The butt extension 40 extends rearwardly from the butt extension mount 34, parallel with the longitudinal axis 32 of the base portion 16. The butt extension 40 has a length 42, which may be, for example, in the range of ten inches to eighteen inches, so that the rearward end 44 of the butt extension 40 may be held conveniently under a user's arm, as shown in FIG. 1, to provide added leverage, when desirable in playing a fish using the rod 10.

Located at the rearward end of the reel seat 28 is a pistol grip portion 46 of the rod handle 12. Located on the under side of the reel seat 28, a short distance ahead of the pistol grip 46, is a trigger portion 48. The pistol grip 46 and the trigger 48 are located with respect to one another so that it is convenient for a fisherman to grasp the pistol grip 46 with the middle, ring, and little fingers, while the index finger reaches around the trigger 48. When the pistol grip 46 is grasped in this manner the thumb is in a convenient position to press against the line spool 50 of the reel 20 to control its rotation so as to control the length of a cast and prevent snarling of line remaining on the spool 50.

In order to provide a secure grip for the fisherman using the rod handle 12, the pistol grip portion 46 preferably has an ovately convex surface 52 located so as to fit against the fisherman's palm, and a convex shoulder 54 is located above the convex surface 52, along the right-hand side of the reel seat 28, providing a convenient surface against which the inside of the index finger of the fisherman's right hand can rest. The front surface 56 of the pistol grip 46 is generally convex but may include shallow horizontal finger channels. A cavity 58 is provided on the rear left portion of the pistol grip 46 and may be engaged by the tips of the middle, ring, and little fingers, depending upon the size of the fisherman's hand.

The location of the pistol grip 46, generally rearward of the reel seat 28, and extending slopingly rearward and downward therefrom, and the location of the trigger portion 48 below the base portion 16, make it convenient to grip the casting rod 10 securely by the rod handle 12. The curvature of the support limb 30 provides clearance for the hand and wrist of the fisherman to grasp the pistol grip 46 in this manner. Nevertheless, the advantages of an extended butt portion of the fishing rod 10 are available as a result of the butt extension 40, supported by the support limb 30 in a position aligned with, but spaced apart rearwardly and upwardly from the pistol grip 46. As a result, the butt extension 40 can be held securely beneath the fisherman's arm to help control the direction of the rod 10, both laterally and vertically, while opposing the force imposed on the tip of the rod 10 by a hooked fish pulling on the line. Nevertheless, by releasing the butt extension 40 from beneath his arm, the fisherman is free to cast a lure or bait using the rod 10 in the well-known one-handed manner.

It will be apparent that the fishing rod 10 is intended for a use by a right-handed fisherman, that is, one who casts holding the rod in his right hand and retrieves line by holding a crank portion of a fishing reel with his left hand. For fishermen preferring to hold a rod in the left hand while casting, and to use a reel which is cranked by grasping the crank handle with the right hand, a symmetrically opposite rod, whose pistol grip is intended for being held by the left hand, and whose butt extension support limb 30 extends on the opposite side, is preferred.

The rod handle 12 may be made of materials used for construction of fishing rods in the past, with the inherent relative advantages or disadvantages of different materials being readily apparent.

Referring now to FIGS. 4–6 of the drawings, a rod 60 which is similar to the rod 10 in most respects includes a rod handle 62 which is basically similar to the rod handle 12, except that it includes a pistol grip 64 of a design which is simpler than that of the pistol grip 46. The rod handle 62 includes no trigger portion, and the pistol grip 64 has a simple rounded oblong sectional shape, extending from a position slightly above the longitudinal axis 32 of the base portion 16, as shown in FIG. 6. A rear side 66 extends arcuately downwardly and rearwardly with respect to the casting reel 20, and, like the pistol grip 46, is located conveniently rearward of the reel 20 to place the fisherman's thumb in an appropriate position to control the line spool 50 of the casting reel 20.

It will be apparent, furthermore, that the reel seat 28 of either of the rod handles 12 or 60 could be modified for use with a reel such as a spinning reel or a fly reel and an appropriately equipped rod member 14. It is to be understood, however, that the benefits of the invention are available to the greatest extent in use of the rod handle of the invention together with a casting reel.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A handle for a fishing rod, comprising:
   (a) a base portion having a reel seat including means for securing a fishing reel thereto and having means for attaching thereto a forwardly-extending rod member;
   (b) a hand grip located rearwardly proximate said reel seat and extending rearwardly and downwardly;
   (c) an elongate butt extension support limb extending rearwardly and laterally away from said reel seat and thence extending to a location rearwardly and upwardly separated from said reel seat; and
   (d) mounting means located on said support limb for receiving a front end portion of a butt extension member.

2. The handle of claim 1, further comprising a butt extension member attached to said mounting means and extending rearwardly therefrom parallel with said base portion of said handle.

3. The handle of claim 1, said reel seat including a supporting surface for receiving a foot of a reel, and said base portion including means for holding a rod member extending forward from said base portion parallel with said supporting surface.

4. The handle of claim 1 wherein said butt extension support limb supports said mounting means at a position at least about three inches rearward and at least about 1½ inches upward from said reel seat.

5. The handle of claim 1 including a downwardly extending trigger portion located beneath said reel seat and forward from said hand grip portion.

6. The handle of claim 1 wherein said butt extension support limb extends arcuately along a helical path between said reel seat and said mounting means.

7. The handle of claim 1 wherein said mounting means includes a cylindrical body whose central axis is parallel with said base portion, said body defining a central hole extending longitudinally thereof for receiving a portion of said butt extension member to secure said butt extension member thereto.

8. The handle of claim 1 wherein said hand grip includes on a first side thereof an ovately convex surface adapted to be received against a palm portion of a user's hand, and on the opposite side includes a cavity adapted to receive the fingertips of said hand.

9. The handle of claim 8 wherein said butt extension support limb is attached to a first side of said reel seat and said ovately convex surface is located on the opposite side of said hand grip.

10. A fishing rod, comprising:
    (a) a rod member including means for supporting a fishing line therealong;
    (b) a base portion having a reel seat including means for securing a fishing reel thereto and having means for fastening said base portion to said rod member in a rearwardly-extending orientation;
    (c) a pistol grip attached to said base portion and extending rearwardly and downwardly with respect to said rod member;
    (d) an elongate butt extension support limb extending rearwardly and laterally away from reel seat, thence to a location rearwardly and upwardly separated from said reel seat; and
    (e) mount means located on said support limb for receiving a front end portion of a rearwardly-directed butt extension member.

11. The fishing rod of claim 10, further comprising a butt extension member attached to said mount means and extending rearwardly therefrom parallel with said rod member.

12. The fishing rod of claim 10, said reel seat including a supporting surface for receiving a foot of a reel, said supporting surface extending parallel with said rod member.

13. The fishing rod of claim 10 wherein said butt extension support limb supports said mounting means at a position at least about three inches rearward and at least about 1½ inches upward from said reel seat.

14. The fishing rod of claim 10, including a downwardly extending trigger portion located forward from said pistol grip.

15. The fishing rod of claim 10 wherein said butt extension support limb extends arcuately along a helical path between said reel seat and said mounting means.

16. The fishing rod of claim 10 wherein said mount means includes a cylindrical body whose central axis is parallel with said base portion, said cylindrical body defining a central hole extending longitudinally thereof for receiving a portion of said butt extension member to secure said butt extension thereto.

17. The fishing rod of claim 10 wherein said pistol grip includes a first side having an ovately convex surface adapted to be received against a palm portion of a user's hand, and an opposite side including a cavity adapted to receive the fingertips of said hand.

18. The fishing rod of claim 13 wherein said butt extension support limb is attached to a first side of said base portion and said ovately convex side is located on the opposite side of said pistol grip.

* * * * *